United States Patent [19]

Vermillion et al.

[11] Patent Number: 5,725,090
[45] Date of Patent: Mar. 10, 1998

[54] CARRYING CASE FOR ELECTRONIC EQUIPMENT

[75] Inventors: Scott Vermillion, Chicago; Louis H. Bernbaum, Lake Forest, both of Ill.

[73] Assignee: High Sierra Sport Company, Vernon Hills, Ill.

[21] Appl. No.: 604,437

[22] Filed: Feb. 21, 1996

[51] Int. Cl.$^6$ ................................. B65D 85/38
[52] U.S. Cl. ................. 206/320; 190/111; 206/583
[58] Field of Search ........................... 206/320, 583; 190/102, 111, 125

[56] References Cited

U.S. PATENT DOCUMENTS

| | | |
|---|---|---|
| 756,925 | 4/1904 | Wood . |
| 3,853,220 | 12/1974 | Luray . |
| 4,013,170 | 3/1977 | Hutterer . |
| 4,431,041 | 2/1984 | Leiserson ................. 190/102 X |
| 4,480,774 | 11/1984 | Smith, et al. . |
| 4,837,590 | 6/1989 | Sprague . |
| 4,919,240 | 4/1990 | Tobias . |
| 5,010,988 | 4/1991 | Brown . |
| 5,105,338 | 4/1992 | Held . |
| 5,105,920 | 4/1992 | Grebenstein . |
| 5,109,961 | 5/1992 | Bergman . |
| 5,160,001 | 11/1992 | Marceau . |
| 5,217,119 | 6/1993 | Hollingsworth . |
| 5,524,754 | 6/1996 | Hollingsworth ................. 206/320 |

FOREIGN PATENT DOCUMENTS 5-309006  11/1993  Japan ................. A45C 11/00

*Primary Examiner*—Bryon P. Gehman
*Attorney, Agent, or Firm*—Rudnick & Wolfe

[57] ABSTRACT

A carrying case is provided for electronic equipment such as a notebook computer. The carrying case includes a frame defining a area for placing the electronic equipment therein such that the frame is in at least partial surrounding relation relative to the electronic equipment. The frame includes a top frame portion and side frame portions extending generally perpendicularly from opposite ends of said top frame portion. A sling includes a first flexible material section and a second flexible material section. The first section depends from a front edge of the top frame portion such that a free end portion thereof is positioned a predetermined distance from the top frame portion. The second section has a back portion positioned in substantially the same vertical plane defined by a back edge of the top frame portion and has a free opposite end portion. A fastener is also provided for releasably securing to each other the free end portions of the first and second sections to define a cradle in the area. Thus, the electronic equipment is adapted to be supported in vertically spaced relation from a support surface on which the carrying case rests as long as the fastener maintains the free end portions of the first and second sections in releasably fastened relation relative to each other. In addition, the opening of the fastener allows movement of the first and second sections of the sling to provide access to the electronic equipment from the front of the area.

22 Claims, 2 Drawing Sheets

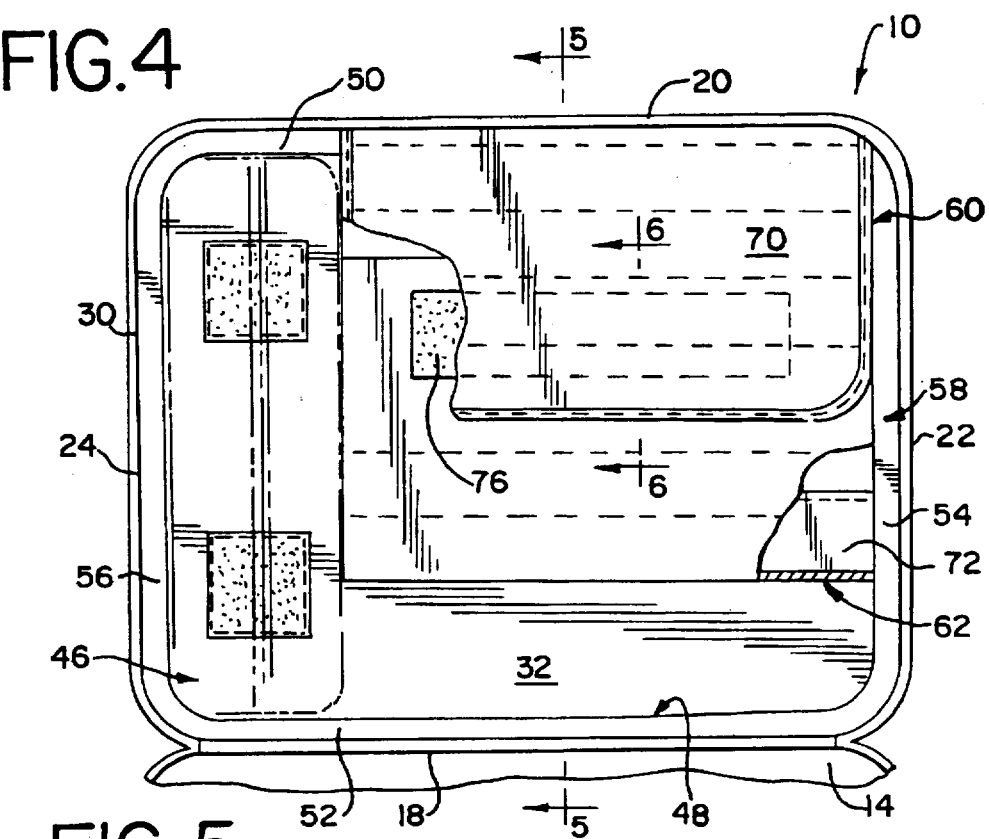

CARRYING CASE FOR ELECTRONIC EQUIPMENT

FIELD OF THE INVENTION

The present invention relates generally to a carrying case for electronic equipment such as a notebook computer, and more particularly, to a soft-sided carrying case adapted to support electronic equipment to minimize shock or impact forces thereon.

BACKGROUND OF THE INVENTION

In recent years, the size and weight of portable computers, commonly referred to as "notebook" computers, have decreased in order to facilitate portability. To allow the computers to be conveniently carried by the owner, typical carrying cases include straps and/or handles and are made of lightweight, flexible, padded material to further minimize the overall carrying weight. When these types of carrying cases are used, however, the computer is subject to damage from impact and shock if dropped on the floor or otherwise handled roughly by baggage handlers at an airport or the like.

Various attempts have been made to provide a carrying case for allowing notebook computers to be conveniently transported while protecting the computer from impact and shock. For example, one such carrying case utilizes a suspension system for supporting a notebook computer within impact resistant stiffening panels. This type of suspension system includes two elastic panels adapted to stretch and absorb the kinetic energy of a notebook computer if the carrying case is dropped. Another type of carrying case includes a pair of mounting straps for suspending a notebook computer above the floor of a soft-sided case so that the soft sides of the case collapse to absorb impact forces.

These types of carrying cases, however, typically provide access to the carrying compartment from the top of the case, which is often configured as a removable flap. In addition, the connection of the suspension panels or straps to the carrying case panels tend not to be in a predetermined configuration tailored to accommodate the thickness of most notebook computers.

It has also become apparent that the business traveler may desire to transport a notebook computer along with other belongings such as clothes and other personal items. It is therefore desirable to provide a combination soft-sided suitcase and notebook computer carrying case adapted to carry various items in addition to a notebook computer.

Accordingly, it remains desirable to provide a carrying case which improves impact-resistance, provides easy access from the front of the case, and is configured in a predetermined arrangement taylored to accommodate the thickness of most notebook computers.

SUMMARY OF THE INVENTION

In view of the above, and in accordance with the present invention, there is provided a carrying case for electronic equipment such as a notebook computer. The carrying case includes a frame defining a compartment for placing the electronic equipment therein. The frame includes a top frame member defining a predetermined width of the compartment and a pair of opposed side frame members extending generally perpendicularly from opposite ends of the top frame member. A sling includes a first flexible material section and a second flexible material section. The first section depends from a front edge of the top frame member such that a free end portion thereof is positioned a predetermined distance from the top frame member. The second section has a back portion positioned in substantially the same vertical plane defined by a back edge of the top frame member and has a free opposite end portion. A fastener is also provided for releasably securing to each other the free end portions of the first and second sections to define a cradle in the compartment. Thus, the electronic equipment is adapted to be supported in vertically spaced relation from bottom edges of the side frame members as long as the fastener maintains the free end portions of the first and second sections in releasably fastened relation relative to each other. In addition, the opening of the fastener allows movement of the first and second sections of the sling to provide access to the electronic equipment from the front of the compartment. In a preferred embodiment of the invention, the carrying case is "soft-sided" and includes a shell of relatively flexible material having a bottom, top, front, rear, and opposite side panels all joined to each other to define a principal interior compartment. The electronic equipment is adapted to be received in the compartment and the front and rear panels are substantially planar and include stiff and impact resistant members. The frame is secured to the shell internally and provides rigid structural support therefore. The frame is arranged in surrounding relation relative to the principal compartment, and the top frame member extends parallel to and adjacent the top panel of the shell. A bottom frame member of a predetermined width extends parallel to the bottom panel of the shell, and the opposed side frame members are connected to and extend between the top and bottom frame members. A releasable fastener is operably associated with the shell to permit opening and closing of the case and thereby provide access to the principal compartment wherein the notebook computer is adapted to be carried.

Preferably, the sling is configured as a two-piece sling extending over one-half the length of the interior principal5 compartment. The two-piece sling includes a first flexible material piece secured lengthwise to the rear panel of the shell and extending over and between the top member of the frame and the top panel of the shell. A free end of the first piece depends freely a predetermined distance from the top panel of the shell. A second flexible material piece is secured to the rear panel to prevent movement therebetween and has a free opposite end. A fastener is also provided for releasably securing to each other the free ends of the first and second pieces to define a cradle in the principal compartment. Thus, the electronic equipment is adapted to be supported in vertically spaced relation from the bottom panel of the shell as long as the fastener maintains the free ends of the first and second pieces in releasably fastened relation relative to each other.

Accordingly, the present invention provides a lightweight, impact-resistant carrying case for electronic equipment with easy access from the front and which is configured to accommodate notebook computers.

The present invention, together with further objects and advantages, will be best understood by reference to the following detailed description taken in conjunction with the accompanying drawings.

BRIEF DESCRIPTION OF THE DRAWINGS

FIG. 4 is a front view of the carrying case shown with the front panel opened and the two-piece sling fastened as illustrated in FIG. 2;

FIG. 5 is a cross-sectional view of the carrying case taken along the line 5—5 in FIG. 4; and FIG. 6 is a partial cross-sectional view of the two-piece sling taken along the line 6—6 in FIG. 4 and showing hook-and-loop type fasteners securing the two pieces together.

DETAILED DESCRIPTION OF THE PREFERRED EMBODIMENT

Figure 1:
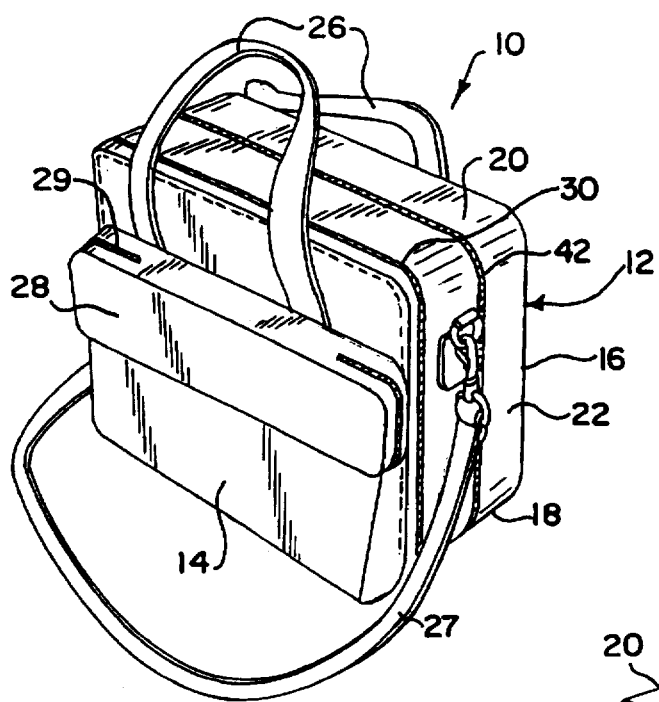
FIG. 1 is perspective view of a preferred embodiment of the invention showing a carrying case in a closed position.
Figure 2:
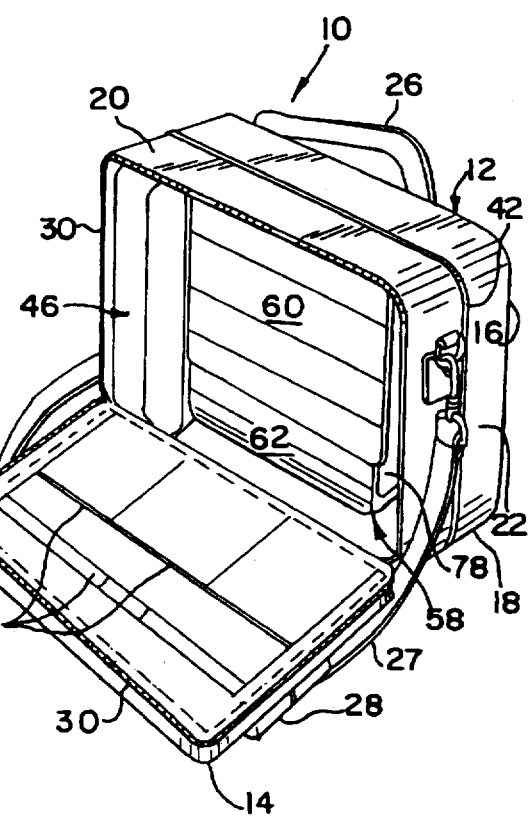
FIG. 2 is a perspective view of the carrying case showing a front panel of an outer shell opened to provide access to a fastened two-piece sling.
Figure 3:
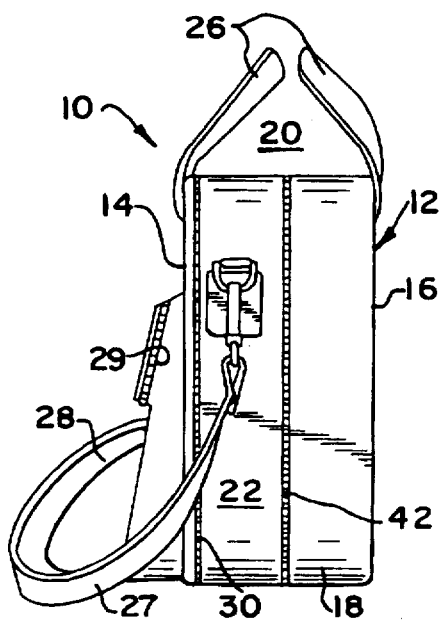
FIG. 3 is a side view of the carrying case shown in a closed position.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a carrying case or article of luggage 10 of soft-sided construction. As shown, the carrying case 10 includes a shell 12 of relatively flexible cloth-like material, preferably a woven canvas fabric, defined by a front panel 14, a rear panel 16, a bottom panel 18, a top panel 20, and opposing side panels 22 and 24. As will be appreciated, the panels 14, 16, 18 and 20 of the shell 12 are substantially planar and may include stiff internal resistant members (not shown). The carrying case 10 further includes elongated handles 26 and 28 that are preferably secured to the front and rear panels 14 and 16, respectively, to facilitate transportation of the carrying case 10. A shoulder strap 30 is also releasably secured to the side panels 22 and 24 to facilitate transportation of the carrying case 10. Preferably, the front panel 14 includes a pocket 26 attached thereto for receiving various articles and which is releasably opened by a zipper 28. As shown, the front panel 14 is also joined to the top panel 20 and side panels 22, 24 by a continuous zipper 30.

As illustrated in FIGS. 4 and 5, an upright dividing panel 32 is provided intermediate the front and rear panels 14 and 16, respectively, to divide the case 10 into two separate compartments 34 and 36. In the illustrated form of the invention, the dividing panel 32 functions or a rear panel of compartment 34, which is intended to be the principal interior compartment for receiving a notebook computer 38 (FIG. 5). Preferably, the dividing panel 32 is suitably secured to the fabric material of the shell 12 and is formed from a relatively stiff, tough plastic material. Moreover, the height and width of panel 32 is preferably covered by a fabric material 40 that forms one of the visible interior surfaces, or backing surface, of compartment 34 of the carrying case 10. Notably, the zipper 30 provides an openable enclosure for access to the principal compartment 34 from the front of the case 10, and a zipper 42 provides an openable enclosure for access to the compartment 36.

As will be appreciated, the present invention is equally applicable to computer cases having a single compartment. Moreover, other ancillary compartments may also be part of the case 10 and may be arranged adjacent to but separated from the principal compartment 34. For example, the illustrated embodiment shows a plurality of pockets 44 formed on the interior of the from panel 14 for receiving articles such as files, peripheral electronic equipment, disks, or the like. A removable, generally vertical side compartment or accessory pack 46 is also provided within the principal compartment 34 for placing various articles therein.

As shown in FIGS. 4 and 5, the computer case 10 further includes an internal, rigid, generally rectangular reinforcing frame 48 which provides structural support to the principal compartment 34. Preferably, the rigid frame 48 is a one-piece cloth exposed and padded member. More specifically, the frame 48 includes a top frame portion or member 50 of a predetermined width and which extends parallel to and is secured lengthwise adjacent to the top panel 20 of the shell 12. The frame 48 furthermore includes a bottom frame portion or member 52 which extends parallel to and is secured lengthwise adjacent to the bottom panel 18 of the shell 12. A pair of opposed rigid side frame members 54 and 56 are connected between and maintain a fixed distance between the top and bottom frame members 50, 52 of the frame 48. Preferably, the predetermined width of the top frame member 50 of the frame 48 is approximately equal to the width of the principal interior compartment 34.

To releasably hold and protect the notebook computer 38 so that shocks and impacts imparted to the case 10 are absorbed without causing damage to the computer 38, a two-piece sling 58 is provided in the principal compartment 34 of the case 10. The sling 58 preferably includes first and second elongated, flexible material sections or pieces 60, 62 of padded cloth material. A mounting edge portion 64 of the first material piece 60 is secured lengthwise to the upright dividing panel 32 adjacent a top edge 66 thereof. The first material piece 60 extends between the top frame member 50 of frame 48 and the top panel 20 of shell 12, and depends loosely from a front edge 68 of the top frame member 50. As such, that portion of the sling 58 adjacent the top of the case 10 is provided with a predetermined width. In addition, the first material piece 60 terminates at a free edge portion 70 a predetermined distance from the top frame member 50, preferably about half-way between the top frame member 50 and the bottom frame member 52.

Likewise, a mounting edge portion 72 of the second material piece 62 of the sling 58 is secured lengthwise to the upright dividing panel 32 in vertically spaced relation to that location where the mounting edge portion 64 of first material piece 60 is fastened to the panel 32, and preferably at an elevation lower than the free edge portion 70 of the first material piece 60. The second material piece 62 of the sling 58 terminates at a free edge portion 74, such that when the computer 38 is carried within the sling 58, the free edge portions 70 and 74 of the first and second material pieces 60 and 62 overlap in length relative to each other.

The two-piece sling 58 further includes suitable fasteners 76 for releasably securing the free edge portions 70 and 74 of the sling pieces to each other, thereby defining an adjustable closed space or cradle 78 wherein the computer 38 is held. Notably, the size of the first and second material pieces 60 and 62 determines the size of the space 78 and the position of the computer 38 relative to a support surface on which the case 10 rests. Preferably, the first and second material pieces 60 and 62 are sized so that when they are fastened together by the fasteners 76, the bottom of the sling 58 and the computer 38 are spaced above the support surface and bottom panel 18 of the case 10.

In a most preferred form of the invention, the fasteners 76 comprise hook and loop type fasteners, commonly referred to as VELCRO® pieces, attached to the opposing free ends or edge portions 70 and 74 of the material pieces 60 and 62. It will be appreciated that any suitable fasteners can be used to attach the material pieces together, such as snaps, buttons, ties or the like. Thus, as long as the fastener 76 maintains the opposite free edge portions of the sling 58 in interconnected relation, the bottom of the sling and the computer 38 are supported in vertically spaced or suspended relation relative to the bottom panel 18 of the case 10.

As shown in FIG. 6, each material piece 60, 62 of the sling 58 has a padded structure. That is, each piece 60, 62 of the sling 58 comprises an inner cloth piece 80 and an outer cloth piece 82 with suitable padding 84 disposed therebetween. As will be appreciated, the padding 84 allows the sling 58 to absorb shocks and impacts imparted thereto without transferring such shocks and impacts to the computer 38 carried in the sling 58. Suitable stitching 86 can be provided across the width of the cloth pieces 80, 82. Moreover, polyethylene boards 88, 90 are preferably provided in the area at the free edge portions 70 and 74 of the cloth pieces 60 and 62 to facilitate releasable interconnection of the pieces 60, 62.

As shown in FIG. 4, sling 58 is sized widthwise of the compartment 34 such that the accessory pack 46 is disposed adjacent thereto, thus preventing the computer 38 from endwise moving within the compartment 34. As will be appreciated by those skilled in the art, other means of preventing endwise movement of the computer 38 may be provided, such as enclosing or restricting exposed lengthwise ends of the sling 58.

Thus, a lightweight, impact-resistant carrying case is provided for holding and protecting electronic equipment with easy access from the front and which is configured to accommodate notebook computers.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A carrying case for electronic equipment, comprising:
a frame defining an area for placing the electronic equipment therein such that said frame is in at least partial surrounding relation relative to the electronic equipment, said frame including a top frame portion and side frame portions extending generally perpendicularly from opposite ends of said top frame portion;
a sling having a first flexible material section depending from a front edge of said top frame portion such that a free end portion of said first flexible material section is positioned a predetermined distance from the top frame portion, and a second flexible material section having a back portion positioned in substantially the same vertical plane defined by a back edge of said top frame portion and having a free opposite end portion; and
a fastener for releasably securing to each other the free end portions of said first and second sections to define a cradle in said area;
wherein the electronic equipment is adapted to be supported in vertically spaced relation from a support surface on which the carrying case rests as long as said fastener maintains said free end portions of said first and second sections in releasably fastened relation relative to each other, and wherein the opening of said fastener allows movement of the first and second sections of the sling to provide access to the electronic equipment from the front of said area.

2. The carrying case of claim 1 wherein the electronic equipment has a width and the top frame portion defines a predetermined width of said area which is approximately the same as the width of the electronic equipment.

3. The carrying case of claim 1 wherein the free end portions of said first and second sections overlap when closed to define said cradle.

4. The carrying case of claim 3 wherein said fastener comprises hook and loop type fasteners disposed on the free end portions of said first and second flexible material sections.

5. The carrying case of claim 4 further comprising stiffening elements provided in the free end portions of said first and second flexible material sections.

6. The carrying case of claim 1 wherein said area is further defined by a rear panel which is generally flush with rear edges of the top and side frame portions.

7. The carrying case of claim 6 wherein the first and second flexible material sections comprise separate pieces of material to define a two-piece sling, said first material section being secured lengthwise to said rear panel and extending over said top frame portion, and said back portion of the second material section being secured to said rear panel at an elevation below the top frame portion.

8. The carrying case of claim 1 wherein the frame is made of a rigid material.

9. The carrying case of claim 1 wherein the first and second flexible material sections are non-elastic.

10. The carrying case of claim 1 wherein the first and second flexible material sections comprise foam padding within a nylon covering.

11. The carrying case of claim 1 further comprising padding disposed on interior surfaces of said frame.

12. The carrying case of claim 1 wherein said frame further comprises a bottom frame portion of a predetermined width, said opposed side frame portions being connected to and extending between the top and bottom frame portions.

13. The carrying case of claim 12 wherein the frame is secured to and provides rigid structural support for a shell of relatively flexible material having a bottom, top, front, rear, and opposite side panels all joined to each other, and wherein said front and rear panels are substantially planar and include stiff and impact resistant portions, said top frame portion extending parallel to and adjacent the top panel of the shell, and said bottom frame portion extending parallel to the bottom panel of the shell.

14. A carrying case for electronic equipment, comprising:
a frame defining an area for placing the electronic equipment therein, said frame including a top frame portion defining a predetermined width of said area and side frame portions extending generally perpendicularly from opposite ends of said top frame portion;
a two-piece sling having a first flexible material piece depending from a front edge of said top frame portion such that a free end portion of said first flexible material piece is positioned a predetermined distance from the top frame portion, and a second flexible material piece secured to a rear panel of the carrying case at an elevation below said top frame portion and having a free opposite end portion adapted to overlap with the free end portion of the first material piece to define a cradle in said area;
a fastener for releasably securing to each other the free end portions of said first and second sections;
wherein the electronic equipment is adapted to be supported in vertically spaced relation from a support surface on which the carrying case rests as long as said fastener maintains said free end portions of said first and second pieces in releasably fastened relation relative to each other, and wherein the opening of said fastener allows movement of the first and second pieces of the sling to provide access to the electronic equipment from the front of said area.

15. The carrying case of claim 14 further comprising stiffening elements provided in the free end portions of said first and second flexible material pieces, wherein said cradle is defined by relatively rigid front and rear portions and a flexible bottom portion.

16. The carrying case of claim 14 wherein said fastener comprises hook and loop type fasteners disposed on the free end portions of said first and second flexible material pieces.

17. The carrying case of claim 14 wherein the frame is made of a rigid material, and the first and second material pieces are non-elastic.

18. The carrying case of claim 14 wherein the first and second flexible material pieces comprise foam padding within a nylon covering.

19. The carrying case of claim 14 wherein said frame further comprises a bottom frame portion of a predetermined width, said opposed side frame portions being connected to and extending between the top and bottom frame portions.

20. The carrying case of claim 19 wherein the frame is secured to and provides rigid structural support for a shell of relatively flexible material having a bottom, top, front, rear, and opposite side panels all joined to each other, and wherein said front and rear panels are substantially planar and include stiff and impact resistant portions, said top frame portion extending parallel to and adjacent the top panel of the shell, and said bottom frame portion extending parallel to the bottom panel of the shell.

21. The carrying case of claim 20 wherein the front panel of said shell is adapted to be releasably attached to the top and side panels to allow access to said area from the front of the carrying case.

22. A soft-sided carrying case for electronic equipment, comprising:

a shell of relatively flexible material having a bottom, top, front, rear, and opposite side panels all joined to each other to define a principal interior area wherein the electronic equipment is adapted to be received, and wherein said front and rear panels are substantially planar and include stiff and impact resistant portions;

an internal reinforcing frame secured to and providing rigid structural support to said shell and arranged in surrounding relation relative to said principal area, said frame defining a top frame portion of a predetermined width and extending parallel to and adjacent the top panel of the shell, a bottom frame portion of a predetermined width and extending parallel to the bottom panel of the shell, and a pair of side frame portions connected to and extending between the top and bottom frame portions;

a releasable fastener operably associated with the shell to permit opening and closing of the case and thereby provide access to the principal area wherein the electronic equipment is adapted to be carried; and a two-piece sling extending over one-half the length of the interior principal area, said sling comprising a first flexible material piece secured lengthwise to said rear panel of said shell and extending over and between said top portion of said frame and the top panel of the shell, with a free end of said first piece depending freely a predetermined distance from the top panel of said shell, and a second flexible material piece secured to said rear panel to prevent movement therebetween and having a free opposite end, and a fastener for releasably securing to each other the free ends of said first and second pieces to define a cradle in said principal area wherein the electronic equipment is adapted to be supported in vertically spaced relation from the bottom panel of the shell as long as said fastener maintains said free ends of said first and second pieces in releasably fastened relation relative to each other.

* * * * *